(12) United States Patent
Sasaki (10) Patent No.: US 10,486,238 B2
(45) Date of Patent: Nov. 26, 2019

(54) CUTTING TOOL

(71) Applicant: TUNGALOY CORPORATION, Fukushima (JP)

(72) Inventor: Yasutake Sasaki, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 3 days.

(21) Appl. No.: 15/557,645

(22) PCT Filed: Nov. 22, 2016

(86) PCT No.: PCT/JP2016/084532
§ 371 (c)(1),
(2) Date: Sep. 12, 2017

(87) PCT Pub. No.: WO2017/098914
PCT Pub. Date: Jun. 15, 2017

(65) Prior Publication Data
US 2018/0085831 A1 Mar. 29, 2018

(30) Foreign Application Priority Data
Dec. 7, 2015 (JP) ................................. 2015-238825

(51) Int. Cl.
*B23B 27/10* (2006.01)
*B23B 27/04* (2006.01)
*B23B 29/04* (2006.01)

(52) U.S. Cl.
CPC .............. *B23B 27/10* (2013.01); *B23B 27/04* (2013.01); *B23B 29/043* (2013.01)

(58) Field of Classification Search
CPC ..... B23B 29/043; B23B 27/10; B23B 200/12; B23B 51/06; B23C 2250/12;
(Continued)

(56) References Cited

U.S. PATENT DOCUMENTS 4,966,500 A 10/1990 Tsujimura et al.
2003/0002936 A1* 1/2003 Camozzi .................. B23C 5/28
408/59

(Continued)

FOREIGN PATENT DOCUMENTS

DE 3434653 A1 4/1985
JP H01-246004 A 10/1989
(Continued)

OTHER PUBLICATIONS

International Search Report issued in PCT/JP2016/084532; dated Feb. 7, 2017.
(Continued)

*Primary Examiner* — Willmon Fridie, Jr.
(74) *Attorney, Agent, or Firm* — Studebaker & Brackett PC (57) ABSTRACT

A cutting tool comprises: a plate member which is provided, at a leading end thereof, edge parts; a support member which supports the plate member so as to cause the edge parts to be projected; and a coolant supply part which has an ejection port and which ejects, from the ejection port, fluid that cools the edge parts. The support member has a non-contact surface which forms a gap with respect to an outer side surface of the plate member. The gap is opened toward a side where the edge parts are provided. The ejection port is arranged in the gap, and the ejection port ejects the fluid toward the plate member.

17 Claims, 6 Drawing Sheets

(58) Field of Classification Search
CPC ....... B23C 2230/00; B23C 5/28; B23Q 11/10; B23Q 11/1023; B23Q 11/1076
See application file for complete search history.

(56) References Cited

U.S. PATENT DOCUMENTS

| | | | |
|---|---|---|---|
| 2010/0178117 A1 | 7/2010 | Watanabe et al. | |
| 2010/0239377 A1* | 9/2010 | Morrison | B23C 5/1045 407/11 |
| 2012/0141220 A1* | 6/2012 | Chen | B23B 31/11 409/136 |
| 2013/0129428 A1* | 5/2013 | Henry | B23B 27/04 407/11 |
| 2013/0223941 A1* | 8/2013 | Bozkurt | B23B 27/18 407/11 |
| 2013/0236253 A1* | 9/2013 | Malka | B23B 27/086 407/11 |
| 2013/0236256 A1* | 9/2013 | Kaufmann | B23B 27/04 407/107 |
| 2015/0209865 A1* | 7/2015 | Malka | B23B 27/086 407/11 |
| 2015/0321263 A1* | 11/2015 | Thelin | B23B 27/08 407/11 |
| 2015/0343534 A1* | 12/2015 | Kaufmann | B23B 27/045 407/11 |
| 2016/0175938 A1* | 6/2016 | Kaufmann | B23B 27/10 407/11 |
| 2016/0193661 A1 | 7/2016 | Kurokawa | |
| 2017/0326650 A1* | 11/2017 | Schwagerle | B23B 27/086 |

FOREIGN PATENT DOCUMENTS

| | | |
|---|---|---|
| JP | H07-237006 A | 9/1995 |
| JP | 2010-105107 A | 5/2010 |
| WO | 2015/108042 A1 | 7/2015 |

OTHER PUBLICATIONS

International Preliminary Report on Patentability and Written Opinion issued in PCT/JP2016/084532; dated Jun. 12, 2018.

* cited by examiner

CUTTING TOOL

TECHNICAL FIELD

The present invention relates to a cutting tool which forms a groove in a workpiece.

BACKGROUND ART

The cutting tool disclosed in Patent Document 1 is known as a conventional cutting tool. Patent Document 1 discloses a cutting tool for forming a groove in an end surface of a workpiece. Such cutting tool comprises a plate member. A plate member is used to appropriately adjust the amount of projection of an edge part in accordance with the depth of a groove to be machined. Such plate member is curved as seen from a leading end side and is fixed to a tool block by means of a clamping member. When using such cutting tool, it is general to eject, from a hose, etc., coolant for cooling an edge part and to supply the coolant to the edge part.

CITATION LIST

Patent Documents

Patent Document 1: WO2015/108042

SUMMARY

Technical Problem

In the case of the cutting tool disclosed in Patent Document 1, if the machining proceeds so that an edge part in its entirety is arranged inside a groove of a workpiece, coolant supplied from a hose arranged outside the groove may not be able to enter the groove and thus not be able to reach the edge part. As a result, the above cutting tool has had a problem in that the edge part is heated to high temperature without being cooled, thereby being subjected to wear within a short time.

The present invention has been made in order to solve the above problem. That is, an object of the present invention is to provide a cutting tool which is capable of reliably supplying fluid to an edge part arranged inside a groove.

Solution to Problem

A cutting tool according to the present invention comprises: a plate member which is provided, at a leading end thereof, edge parts; a support member which supports the plate member so as to cause the edge parts to be projected; and a fluid supply part which has an ejection port and which ejects, from the ejection port, fluid that cools the edge parts. The support member has a non-contact surface which forms a gap with respect to the plate member. The gap is opened toward a side where the edge parts are provided. The ejection port is arranged in the gap, and the ejection port ejects the fluid toward the plate member.

The fluid supply part preferably has, inside the support member, a flow path through which fluid passes, and the ejection port is preferably provided so as to be open in the non-contact surface.

The non-contact surface is preferably formed by notching an end of the support member.

The plate member is preferably curved so as to be projected toward the support member.

The plate member is preferably configured so as to be slidable with respect to the support member, and the cutting tool preferably also comprises fixing means for fixing the plate member.

The fixing member preferably has a pressure member which presses the plate member toward the support member and a fastening member which fastens the pressure member to the support member.

The plate member preferably has a body having a plate shape and a cutting insert having edge parts, and the cutting insert is preferably removably mounted on the body.

Advantageous Effects of Invention

The present invention can provide a cutting tool which is capable of reliably supplying fluid to edge parts arranged inside a groove.

DESCRIPTION OF EMBODIMENTS

An embodiment will hereinafter be described with reference to the drawings. It should be noted that descriptions will be made with an arrow A direction in FIG. 1 serving as a leading end direction.

Figure 1:
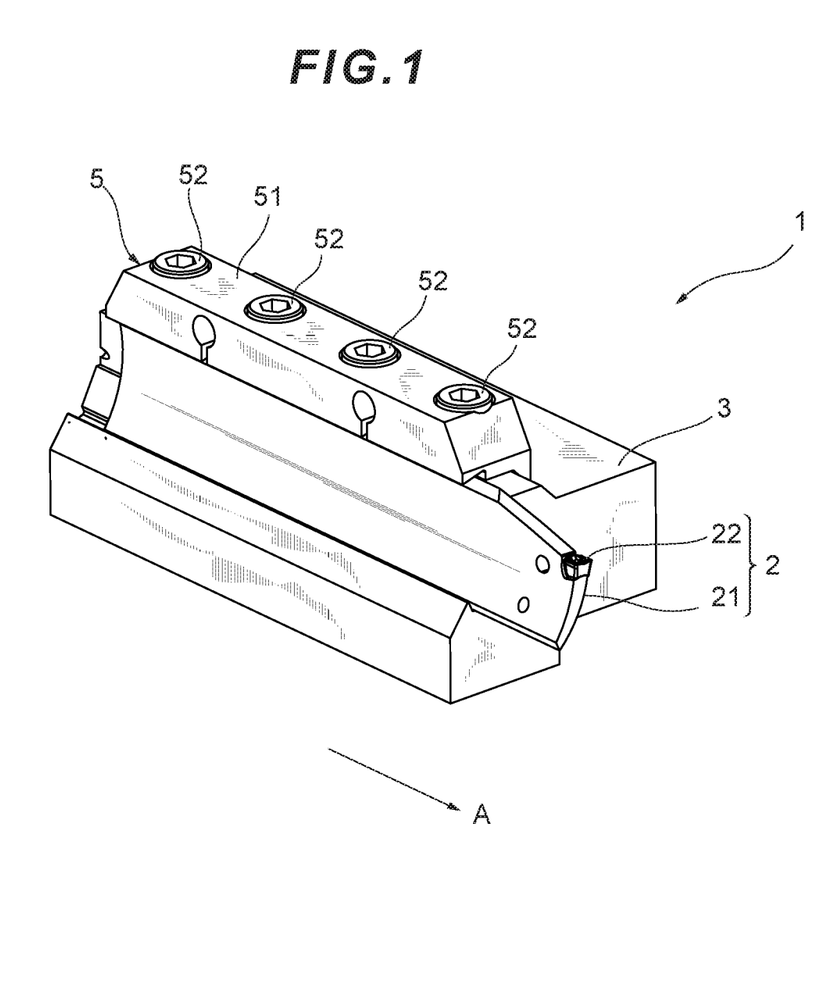
FIG. 1 is a perspective view of a cutting tool according to an embodiment.

As shown in FIG. 1, a cutting tool 1 of the present embodiment comprises a plate member 2, a support member 3 and a fixing member 5. Further, as shown in FIG. 2, the cutting tool 1 comprises a coolant supply part 4.

Figure 2:
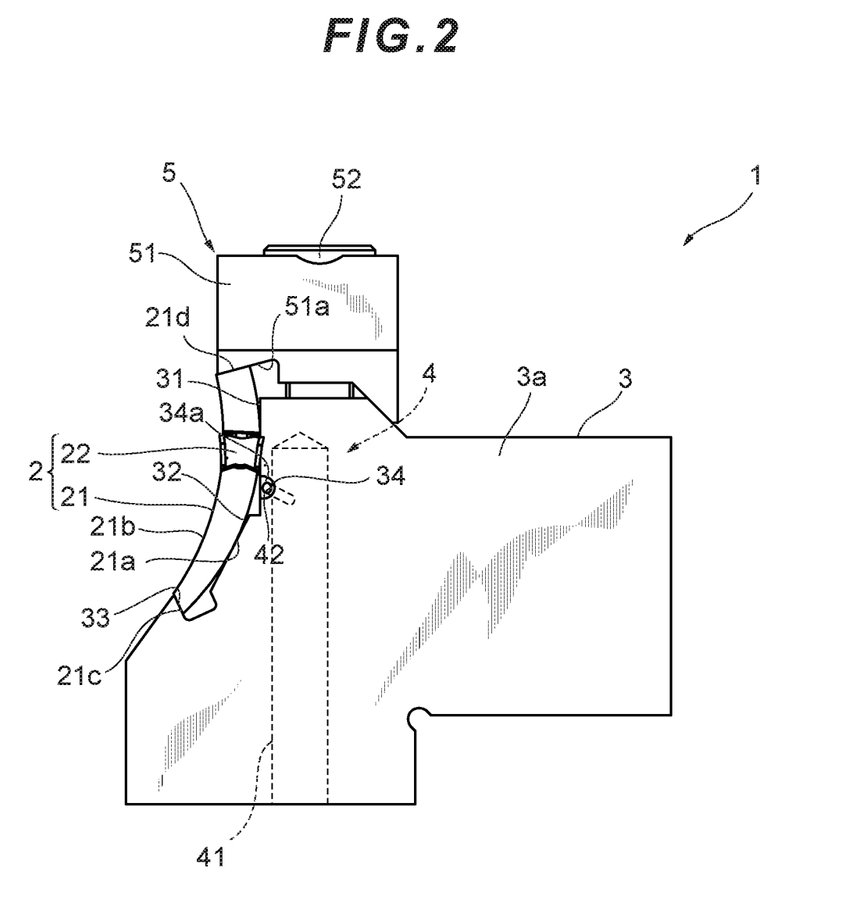
FIG. 2 is a front view of the cutting tool of FIG. 1.

As shown in FIGS. 1 and 2, a plate member 2 has a body 21 and a cutting insert 22. The body 21 has a curved plate shape. As shown in FIG. 2, the body 21 has an outer circumferential surface 21a serving as an outer side surface, an inner circumferential surface 21b and end surfaces 21c, 21d. The outer circumferential surface 21a and the inner circumferential surface 21b are each curved in a substantially circular arc shape in a front view. The end surfaces 21c, 21d are planes which connect an end of the outer circumferential surface 21a and an end of the inner circumferential surface 21b.

Figure 3:
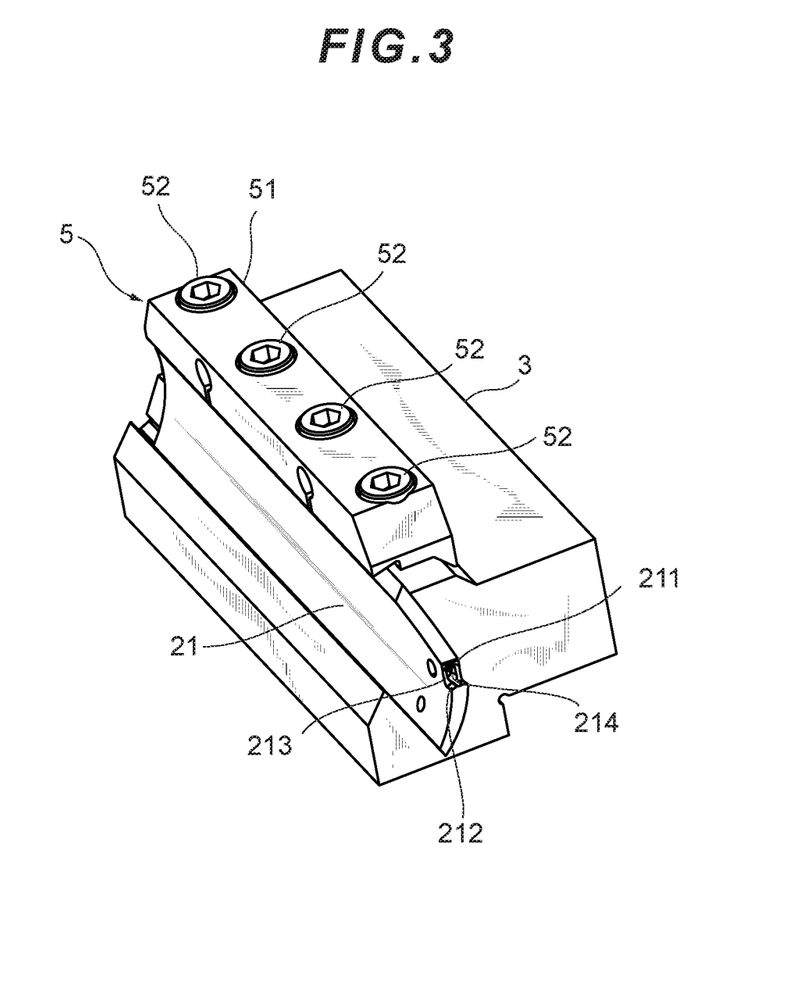
FIG. 3 is a perspective view of the cutting tool of FIG. 1.

As shown in FIG. 3, an insert seat 211 is formed at an end of the body 21 in the leading end direction. The insert seat 211 is a notch formed at a corner of the body 21. The insert seat 211 has a bottom surface 212 and a wall part 213 arranged on a base end side. The wall part 213 of the insert seat 211 is provided with a mounting hole 214.

Figure 4:
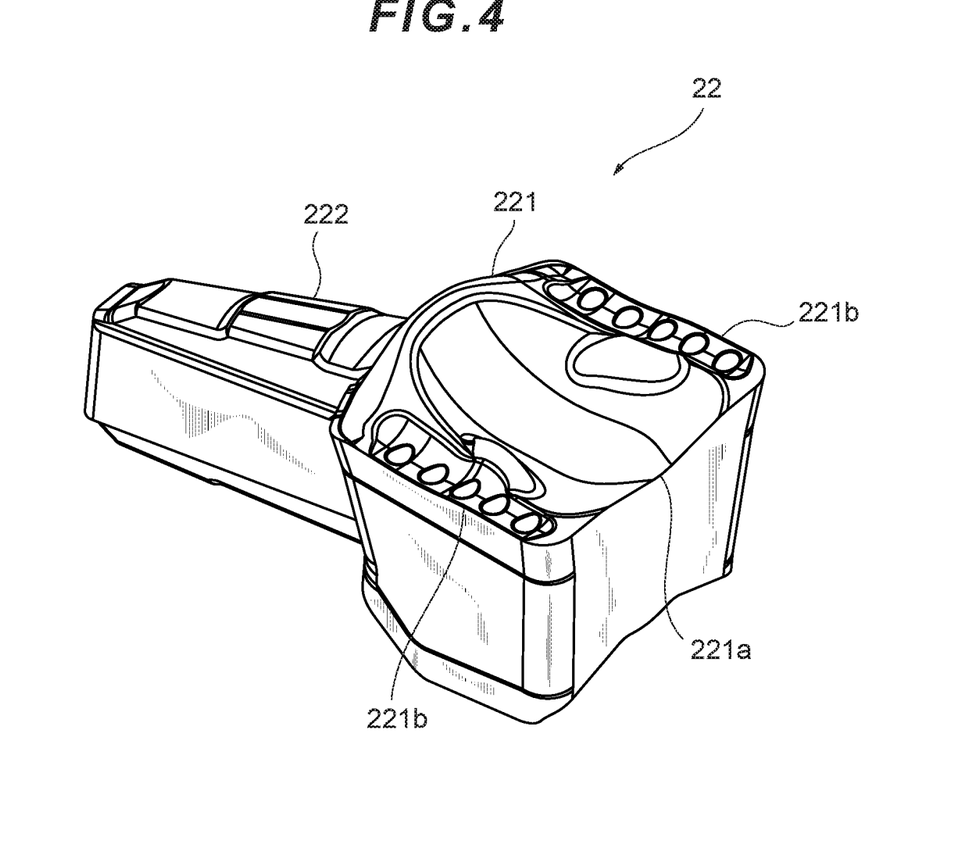
FIG. 4 is a perspective view of a cutting insert of FIG. 1.

As shown in FIG. 4, the cutting insert 22 has a leading end part 221 and a protrusion part 222. The leading end part 221 has edge parts 221a, 221b in its edge. The edge part 221a is a cutting edge which cuts a workpiece so as to form a bottom of a groove. The edge part 221b is a cutting edge which cuts a workpiece so as to form a side of a groove. The protrusion part 222 is projected from one side surface of the leading end part 221.

The cutting insert 22 is fixed to the insert seat 211 of the body 21. More specifically, the protrusion part 222 of the cutting insert 22 is fitted into the mounting hole 214 and is then held by the body 21, whereby the cutting insert 22 is fixed to the insert seat 211. Part of an outer side surface of the leading end part 221 of the cutting insert 22 comes into contact with the bottom surface 212 of the insert seat 211 and is thereby supported. As shown in FIG. 1, the cutting insert 22 is fixed to the insert seat 211 while the edge parts 221a, 221b are being exposed.

As shown in FIG. 1, the support member 3 is a member which supports the plate member 2 so as to allow the cutting insert 22 to be projected closer to a leading end than an end of the support member 3. An upper surface of the support member 3 is provided with a plurality of threaded holes (not shown) into which screws 52 of the fixing member 5, which is described below, are screwed.

Figure 5:
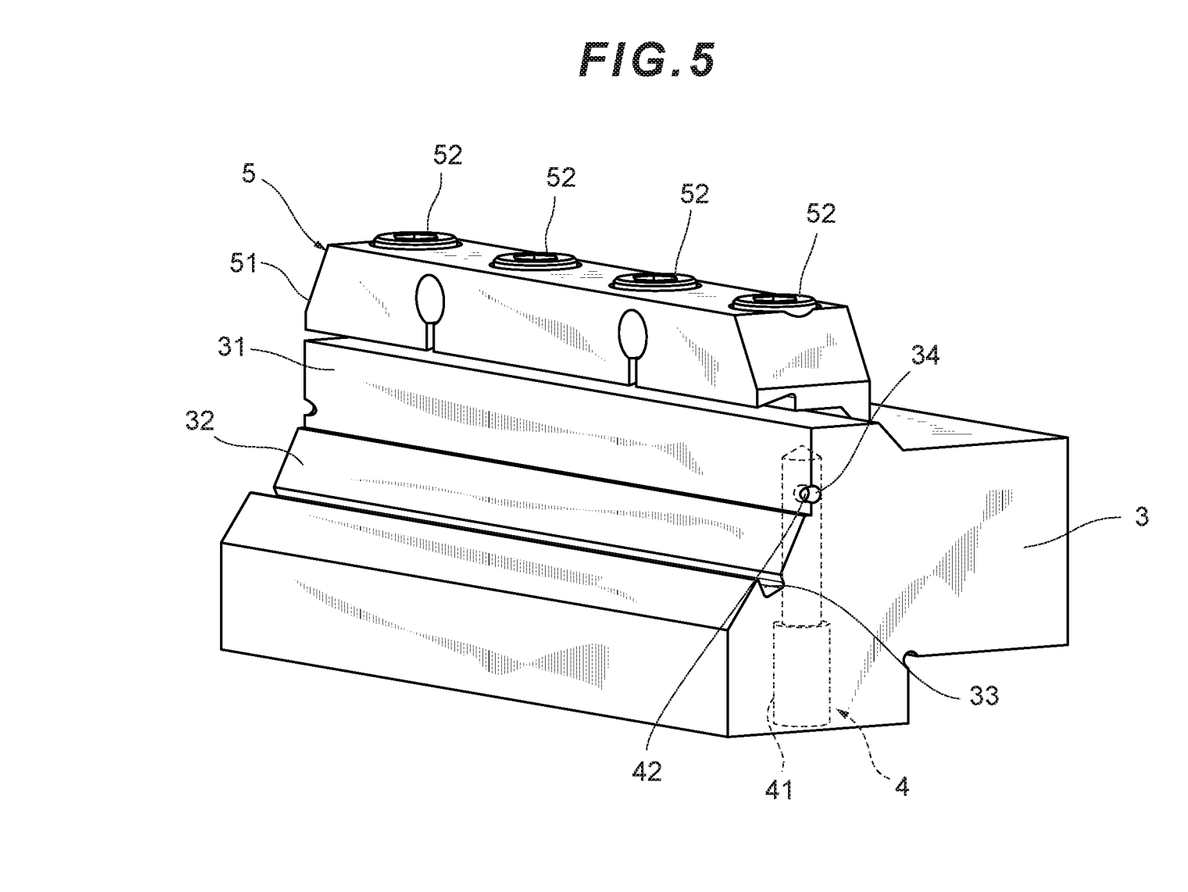
FIG. 5 is a perspective view of a support member and a fixing member of FIG. 1.

Further, as shown in FIGS. 2 and 5, the support member 3 has a first wall surface 31, a second wall surface 32 and a third wall surface 33. The first wall surface 31, the second wall surface 32 and the third wall surface 33 are all planes which come into contact with the body 21 of the plate member 2. More specifically, as shown in FIG. 2, the first wall surface 31 comes into contact with part of the outer circumferential surface 21a of the body 21. The second wall surface 32 is arranged so as to form an obtuse angle with the first wall surface 31, and comes into contact with another part of the outer circumferential surface 21a of the body 21. The third wall surface 33 comes into contact with the end surface 21c of the body 21 and supports the plate member 2 such that the plate member 2 does not fall. The plate member 2 is supported by the first wall surface 31, the second wall surface 32 and the third wall surface 33, whereby, unless the support member 3 is fixed by the fixing member 5 described below, the plate member 2 is configured so as to be slidable in the leading end direction with respect to the support member 3.

A notch 34 is arranged at a leading end part of the first wall surface 31. The notch 34 has a shape like an obliquely cut cylinder. As shown in FIG. 2, the notch 34 is a non-contact surface with respect to the outer circumferential surface 21a of the plate member 2 supported by the support member 3. In other words, the notch 34 forms a gap 34a with respect to the outer circumferential surface 21a of the plate member 2 supported by the support member 3. The notch 34 reaches the end surface 3a, which is located in the leading end direction, of the support member 3 and also notches part of the end surface 3a.

The coolant supply part 4 supplies coolant to the edge parts 221a, 221b of the cutting insert 22 and thereby cools the edge parts 221a, 221b. As shown in FIGS. 2 and 5, the coolant supply part 4 has a flow path 41 and an ejection port 42. The flow path 41 is a hole formed so as to extend from an outer side surface of the support member 3 toward the inside. The ejection port 42, serving as an outlet of the flow path 41, is provided so as to be open in the notch 34. The ejection port 42 is directed toward the leading end side. In other words, the ejection port 42 is provided so as to be open such that the ejection port 42 ejects coolant which flows through the flow path 41 toward the leading end side.

It should be noted that the ejection port 42 is preferably provided so as to be open toward the plate member 2. More specifically, the ejection port 42 is preferably provided so as to be open such that a normal of the ejection port 42 is directed toward the plate member 2. Further, the coolant which is made to flow through the flow path 41 may be either liquid or gas, as long as it is fluid which is to be used to cool the edge parts 221a, 221b. The gas includes a mist gas.

The fixing member 5 is a member which fixes the plate member 2, which is slidable as described above, to the support member 3. As shown in FIG. 1, the fixing member 5 comprises a pressure member 51 and the plurality of screws 52.

As shown in FIG. 2, the pressure member 51 has a contact surface 51a as a plane thereof. The pressure member 51 is further provided with a plurality of through holes (not shown) which penetrate an upper surface thereof and a lower surface thereof. The pressure member 51 is arranged, above the support member 3, such that the contact surface 51a comes into surface contact with the end surface 21d of the plate member 2. The screws 52 are inserted through the through holes of the pressure member 51 and are also screwed into the threaded holes formed in the upper surface of the support member 3. As a result, the pressure member 51 is fastened to the support member 3.

When a fastening force of the screw 52 is increased, a head part of the screw 52 presses the pressure member 51 downward. The pressure member 51 presses the end surface 21d of the plate member 2 downward, via the contact surface 51a. As a result, the plate member 2 is sandwiched by the contact surface 51a and the third wall surface 33, and the outer circumferential surface 21a is supported by the first wall surface 31 and the second wall surface 32, whereby the plate member 2 is fixed to the support member 3.

Figure 6:
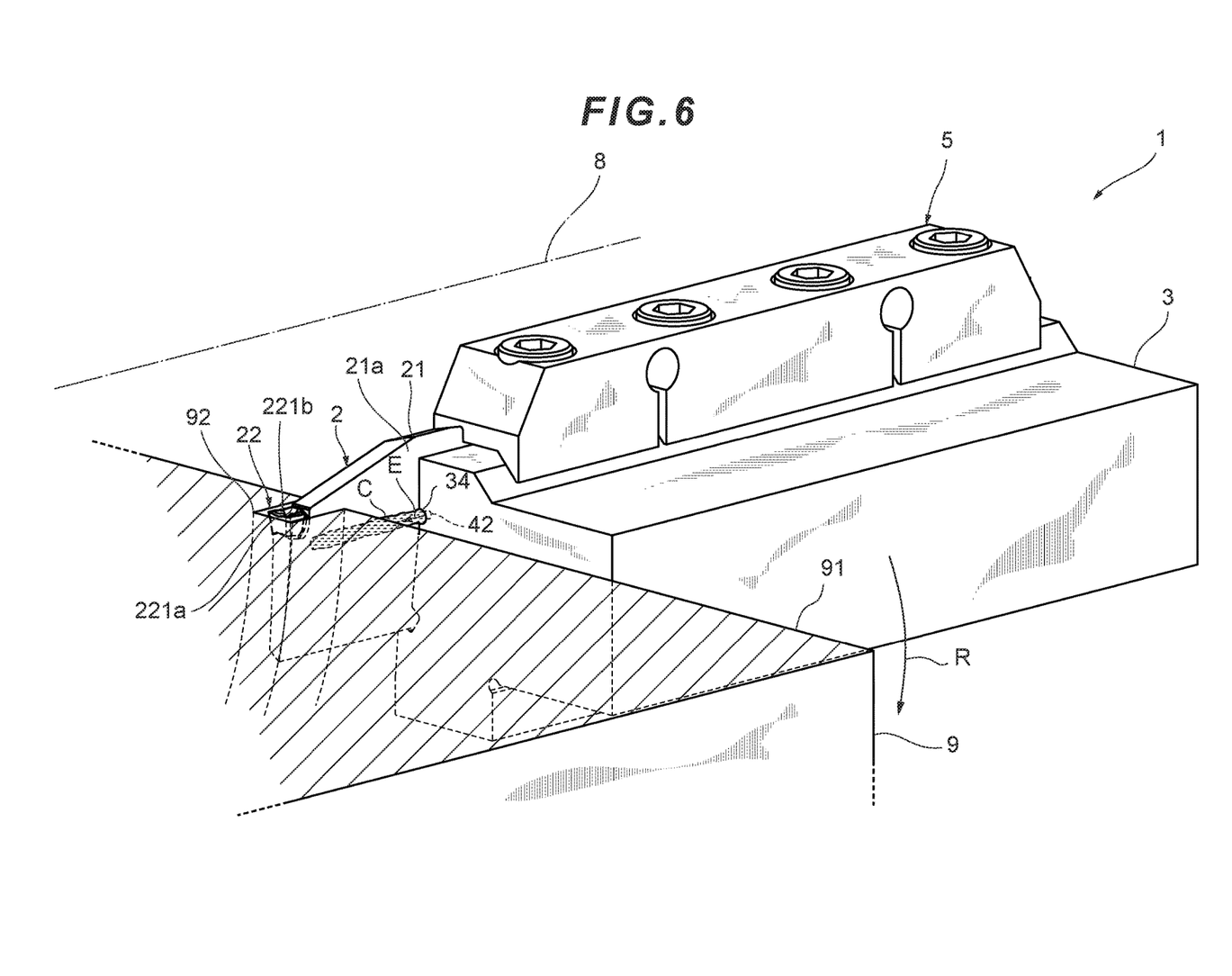
FIG. 6 is an explanatory view of cutting by the cutting tool of FIG. 1.

Next, cutting by way of the cutting tool 1 will be described with reference to FIG. 6. FIG. 6 shows a cross-section of a workpiece 9 which is cut by the cutting tool 1. For ease of understanding of the description, FIG. 6 shows the cross-section of the workpiece 9 in a see-through manner.

The workpiece 9 cut by the cutting tool 1 is rotated in a direction indicated by an arrow R around an axis 8 which is distant from the plate member 2. When the cutting insert 22 of the cutting tool 1 is caused to abut against an end surface 91 of the workpiece 9, the edge part 221a of the cutting insert 22 cuts the end surface 91. When the cutting insert 22 is further caused to abut against the end surface 91, the cutting insert 22 enters the workpiece 9 through the cut. As a result, an annular groove 92 is formed in the end surface 91 of the workpiece 9.

At this time, the gap 34a (see FIG. 2), which is formed by the notch 34 of the support member 3, is opened toward the workpiece 9. Therefore, the ejection port 42 arranged in the gap 34a ejects coolant C toward the workpiece 9, as indicated by an arrow E.

Part of the coolant C ejected from the ejection port 42 is directed toward the plate member 2 as well. When the coolant C adheres to the outer circumferential surface 21a of the plate member 2, the coolant C moves along the outer circumferential surface 21a and then flows into the groove 92. The coolant C reaches the edge parts 221a, 221b of the cutting insert 22 which are arranged inside the groove 92. Thus, when the machining proceeds so that the entireties of the edge parts 221a, 221b of the cutting insert 22 are arranged inside the groove 92, the edge parts 221a, 221b can be cooled in a reliable manner.

In other words, in the cutting tool 1, it does not mean that the coolant C in its entirety is ejected from the ejection port 42 directly toward the edge parts 221a, 221b; rather, the coolant C is intentionally ejected toward the plate member 2 as well. As a result, the coolant C can be supplied reliably to the edge parts 221a, 221b arranged inside the narrow groove 92 without being obstructed by the workpiece 9.

Further, the coolant C adhering to the plate member 2 cools the plate member 2 and the cutting insert 22 fixed to the plate member 2. The plate member 2 is cooled, as described above, whereby the edge parts 221a, 221b can be cooled indirectly. The wear of the edge parts 221a, 221b is suppressed by means of cooling, leading to the extension of the lives thereof.

Further, the coolant supply part 4 has, inside the support member 3, the flow path 41 through which the coolant C passes. The ejection port 42 is provided so as to be open in the non-contact surface 34. With this configuration, the ejection port 42 can be arranged in the vicinity of the plate member 2 without using a hose, etc. Consequently, the coolant C ejected from the ejection port 42 can be caused to reliably move along the plate member 2 and thereby be supplied reliably to the edge parts 221a, 221b.

Further, the notch 34, being a non-contact surface, is formed by notching the end of the support member 3. This configuration can suppress the adhesion to the ejection port 42 of chips produced during the cutting of the workpiece 9. Consequently, the coolant C ejected from the ejection port 42 can be caused to reliably move along the plate member 2 and thereby be supplied reliably to the edge parts 221a, 221b.

The present invention has been described above, taking an embodiment of the invention as an example. However, the present invention is not limited to the above embodiment. In other words, various modifications may be made to the present invention without departing from the essential technical idea of the present invention to the effect that "a plate member is used so as to supply fluid to edge parts."

For example, part of an outer side surface of the support member 3 may be provided with a non-contact surface to be arranged with a predetermined space with respect to the plate member 2 such that the non-contact surface extends along the plate member 2. A gap may be formed between such non-contact surface and the plate member 2 so as to be opened on a side where the edge parts 221a, 221b are provided, and coolant may be ejected into such gap. In this case, an ejection port is provided in the non-contact surface of the support member 3. As a result, the entirety of the coolant ejected from the ejection port moves along the plate member 2. Consequently, the amount of coolant which reaches the edge parts 221a, 221b arranged inside the groove 92 can be increased compared with the case of the above embodiment.

As to the plate member, it may have a flat plate shape without being curved as in the above embodiment. The edge parts provided in the plate member may not be removable, as opposed to the above embodiment, and the edge parts may instead be integrated, via brazing, etc., with the plate member.

REFERENCE SIGNS LIST

1 Cutting tool
2 Plate member
21 Body
22 Cutting insert
221a, 221b Edge parts
3 Support member
34 Notch (non-contact surface)
34a Gap
4 Coolant supply part (fluid supply part)
41 Flow path
42 Ejection port
5 Fixing member
51 Pressure member
51a Contact surface
92 Groove

What is claimed is:

1. A cutting tool which forms a groove in a workpiece, the cutting tool comprising:
a plate member which is provided, at a leading end thereof, with edge parts, the plate member having an outer circumferential surface that is curved in a substantially circular arc shape in a front view;
a support member which supports the plate member so as to cause the edge parts to be projected; and
a fluid supply part which has an ejection port and which ejects, from the ejection port, fluid that cools the edge parts, wherein:
the support member has a non-contact surface which forms a gap with respect to an outer side surface of the plate member;
the gap is opened toward a side where the edge parts are provided;
the ejection port is arranged in the gap, and the ejection port ejects the fluid toward the plate member;
the non-contact surface is provided at an end portion of a wall surface of the support member;
the ejection port is provided so as to be open in the non-contact surface such that the fluid ejected from the ejection port adheres to the outer circumferential surface of the plate member; and
the ejection port is provided so as to be open such that a normal of the ejection port is directed toward the plate member.

2. The cutting tool according to claim 1, wherein:
the fluid supply part has, inside the support member, a flow path through which the fluid passes; and
the ejection port is provided so as to be open in the non-contact surface.

3. The cutting tool according to claim 2, wherein the non-contact surface is formed by notching an end of the support member.

4. The cutting tool according to claim 1, wherein the plate member is curved so as to be projected toward the support member.

5. The cutting tool according to claim 1, wherein:
the plate member is configured so as to be slidable with respect to the support member; and
the cutting tool comprises a fixing member for fixing the plate member.

6. The cutting tool according to claim 5, wherein the fixing member has a pressure member which presses the plate member toward the support member and a fastening member which fastens the pressure member to the support member.

7. The cutting tool according to claim 1, wherein:
the plate member has a body having a plate shape and a cutting insert having the edge parts; and
the cutting insert is removably mounted on the body.

8. The cutting tool according to claim 2, wherein the plate member is curved so as to be projected toward the support member.

9. The cutting tool according to claim 3, wherein the plate member is curved so as to be projected toward the support member.

10. The cutting tool according to claim 2, wherein:
the plate member is configured so as to be slidable with respect to the support member; and
the cutting tool comprises a fixing member for fixing the plate member.

11. The cutting tool according to claim 3, wherein:
the plate member is configured so as to be slidable with respect to the support member; and
the cutting tool comprises a fixing member for fixing the plate member.
12. The cutting tool according to claim 4, wherein:
the plate member is configured so as to be slidable with respect to the support member; and
the cutting tool comprises a fixing member for fixing the plate member.
13. The cutting tool according to claim 2, wherein:
the plate member has a body having a plate shape and a cutting insert having the edge parts; and
the cutting insert is removably mounted on the body.
14. The cutting tool according to claim 3, wherein:
the plate member has a body having a plate shape and a cutting insert having the edge parts; and
the cutting insert is removably mounted on the body.
15. The cutting tool according to claim 4, wherein:
the plate member has a body having a plate shape and a cutting insert having the edge parts; and
the cutting insert is removably mounted on the body.
16. The cutting tool according to claim 5, wherein:
the plate member has a body having a plate shape and a cutting insert having the edge parts; and
the cutting insert is removably mounted on the body.
17. The cutting tool according to claim 6, wherein:
the plate member has a body having a plate shape and a cutting insert having the edge parts; and
the cutting insert is removably mounted on the body.

\* \* \* \* \*